Oct. 20, 1964

S. D. POOL 3,153,311

MOBILE FRUIT PICKER

Filed Nov. 14, 1960

INVENTOR.
Stuart D. Pool
Paul O. Pippel
Atty.

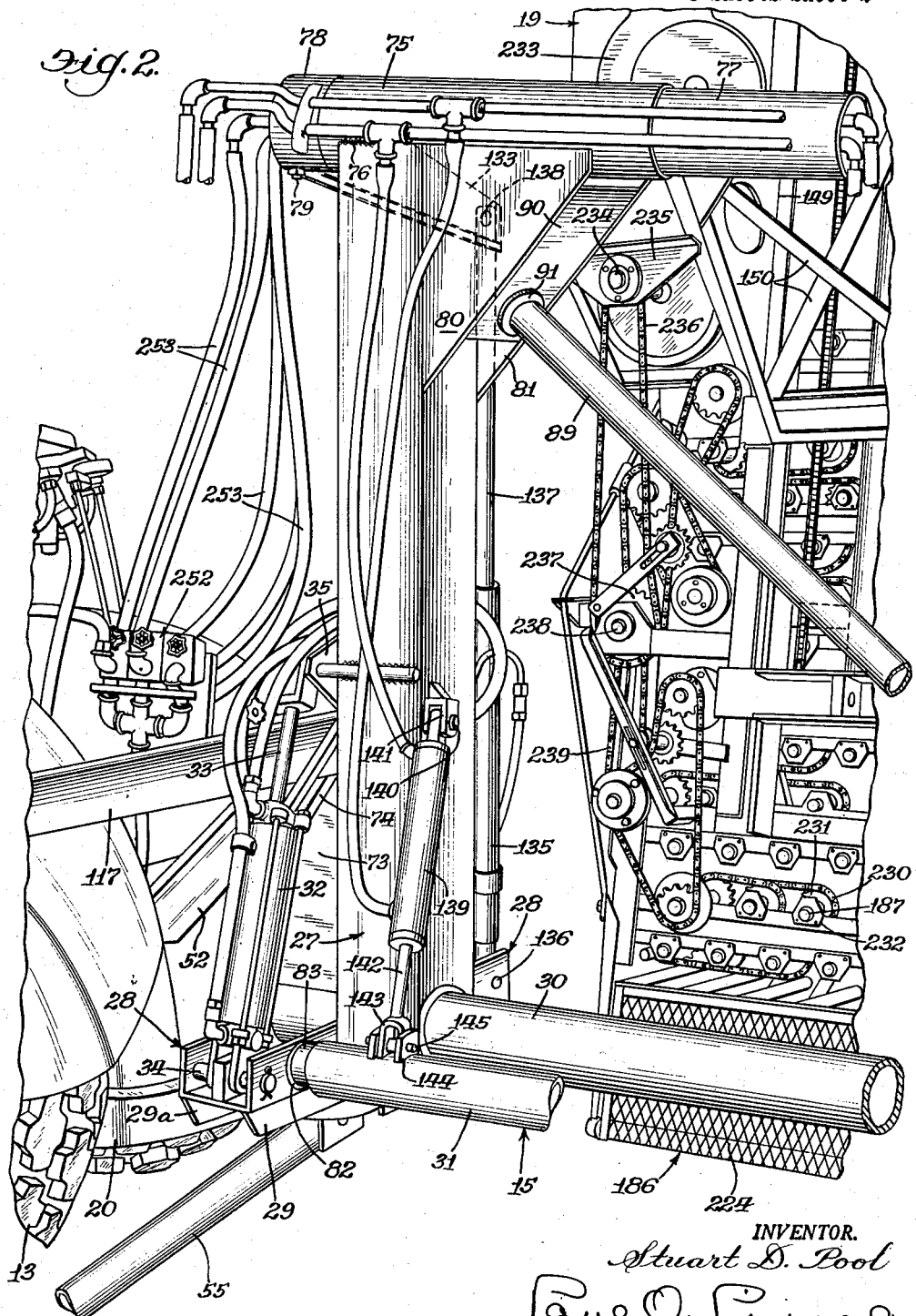

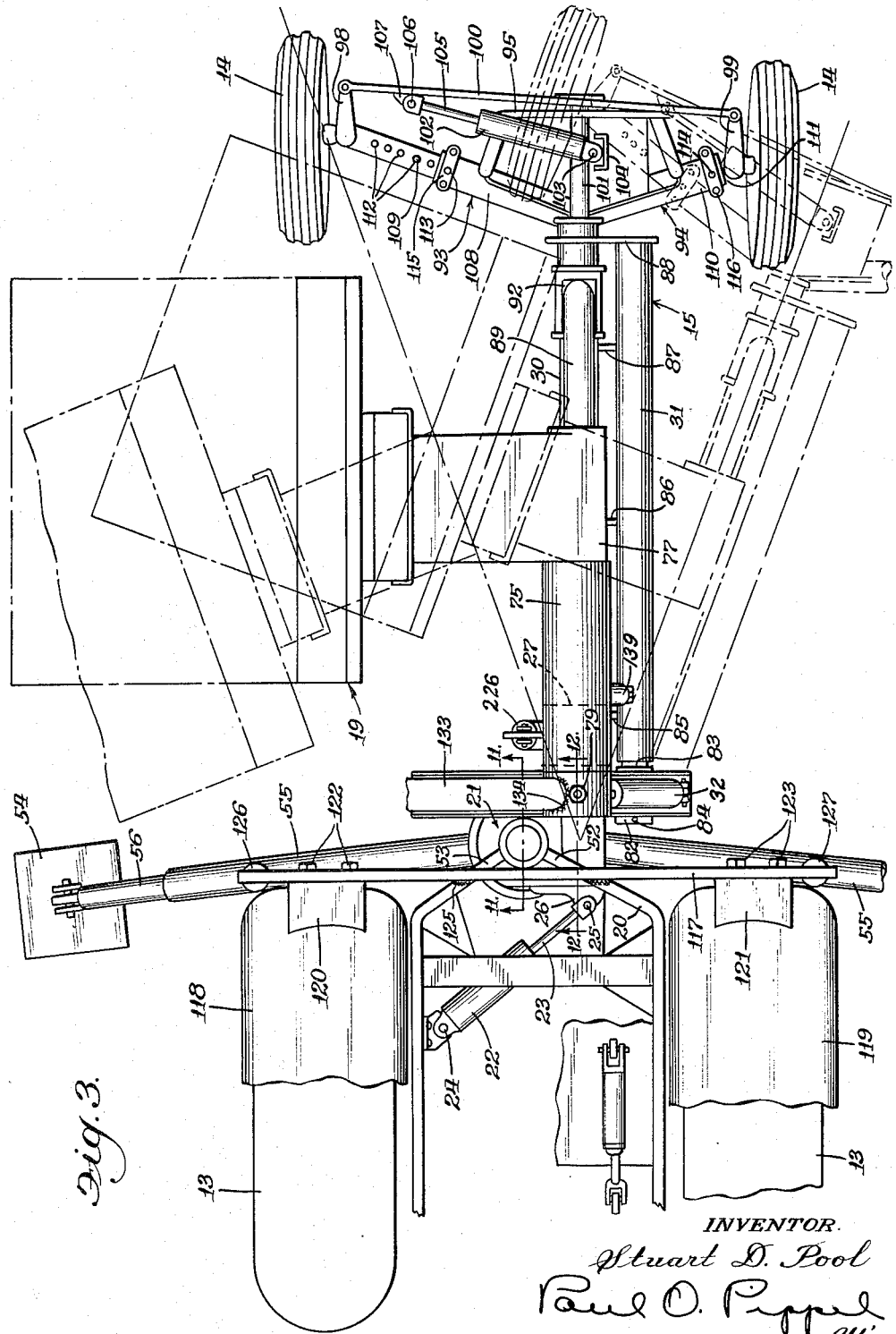

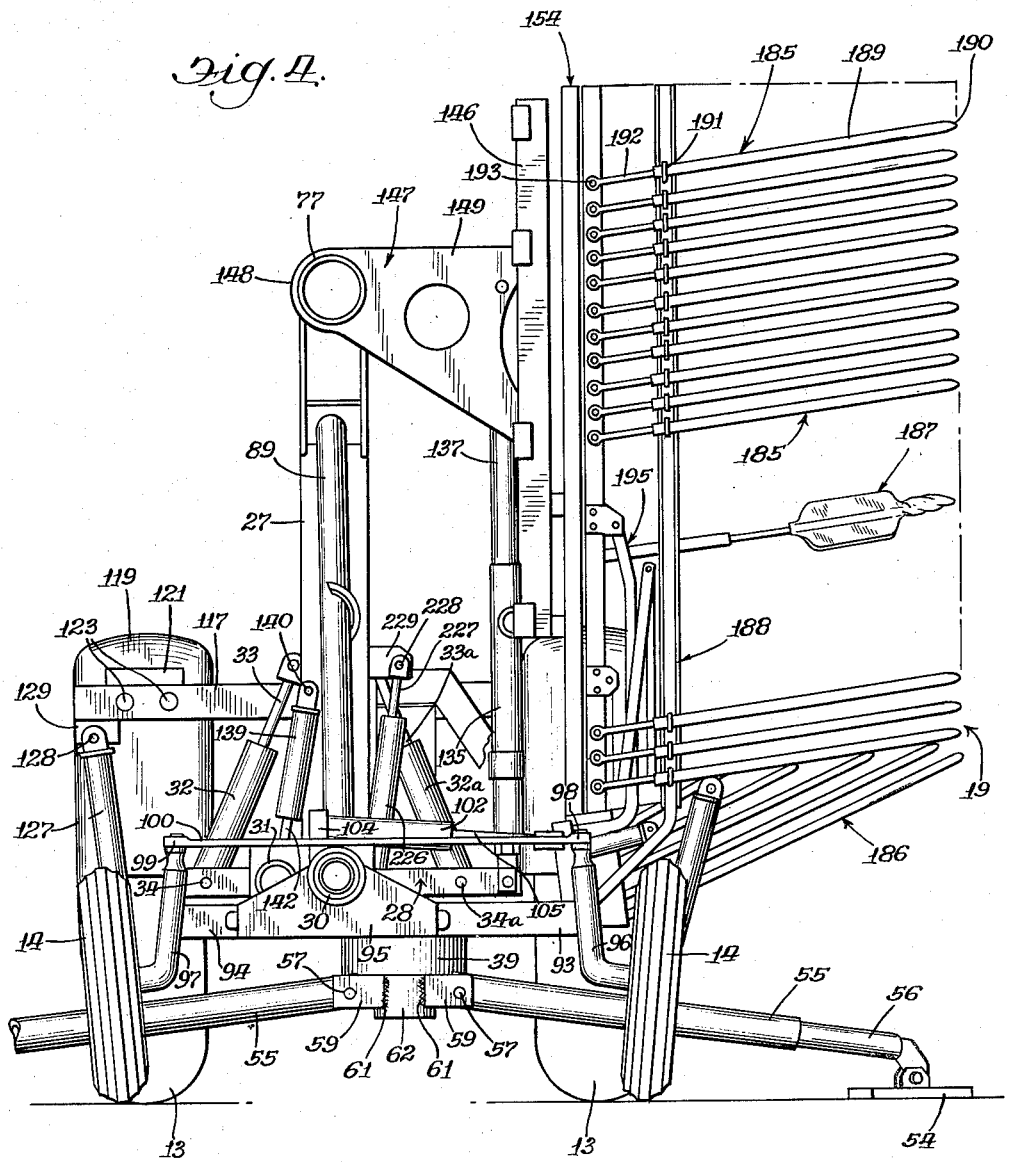

INVENTOR.
Stuart D. Pool
Paul O. Pippel
Atty.

Oct. 20, 1964 S. D. POOL 3,153,311
MOBILE FRUIT PICKER
Filed Nov. 14, 1960 8 Sheets-Sheet 6
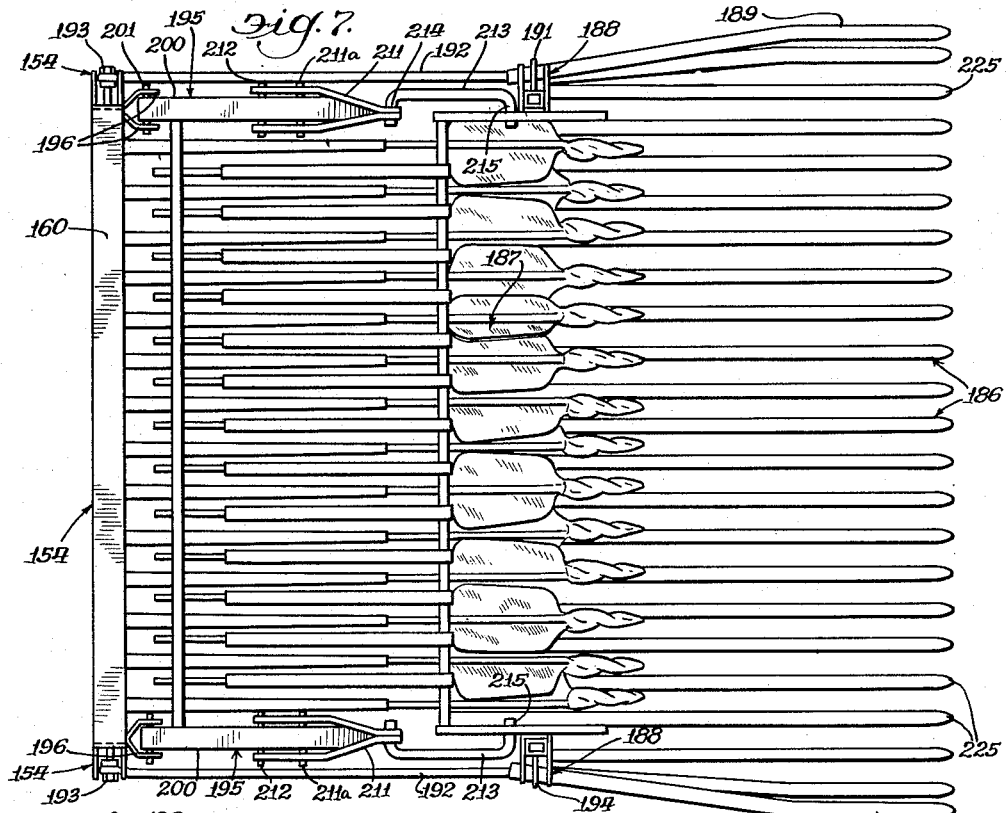
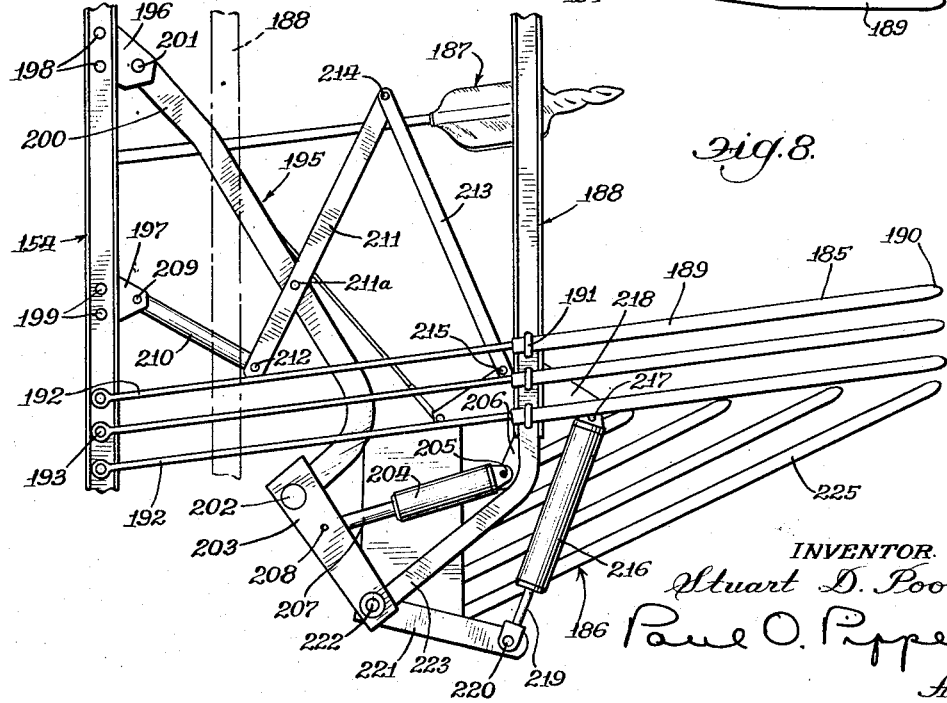
INVENTOR.
Stuart D. Pool
Paul O. Pippel
Atty.

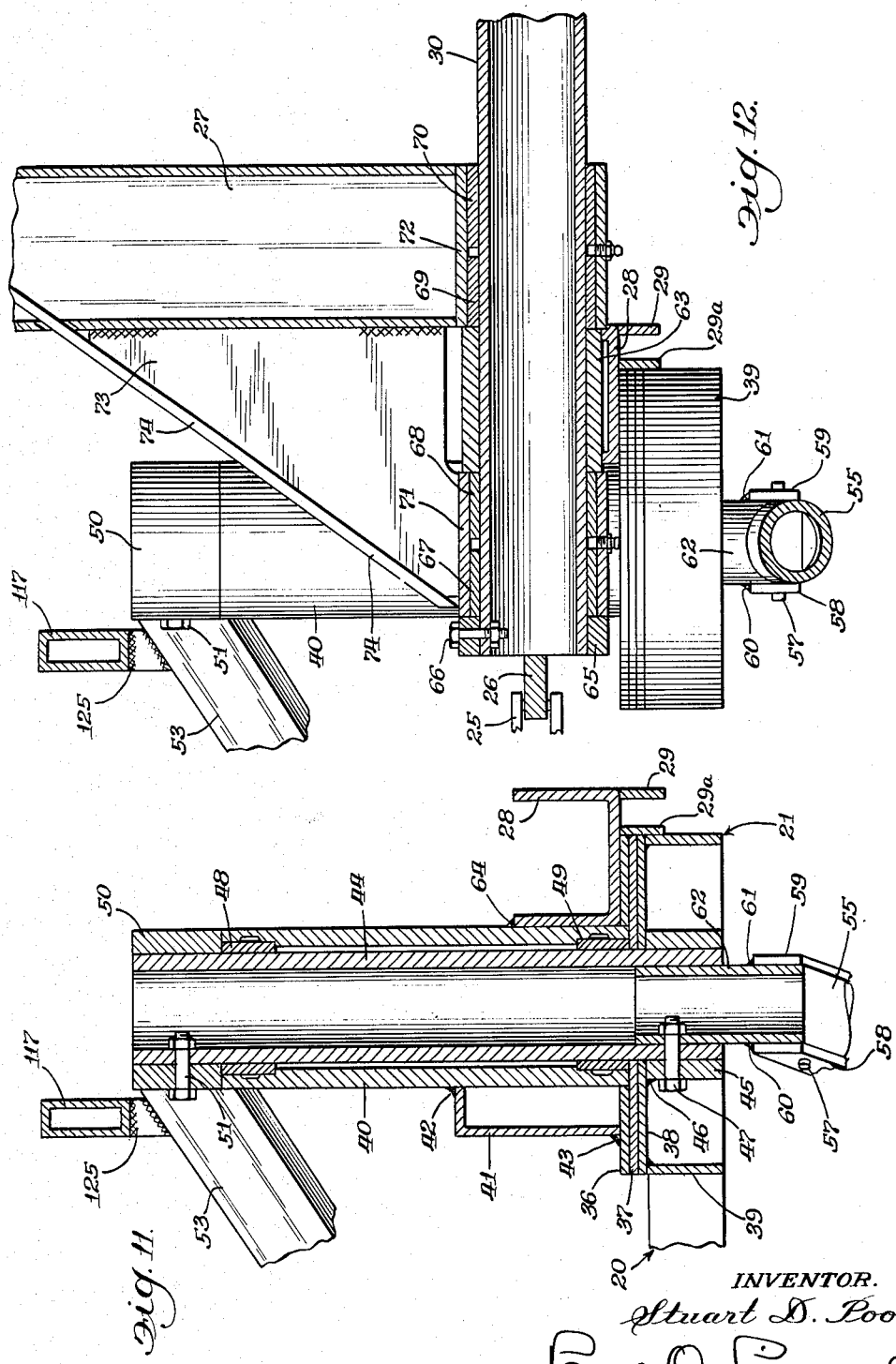

Oct. 20, 1964 S. D. POOL 3,153,311
MOBILE FRUIT PICKER
Filed Nov. 14, 1960 8 Sheets-Sheet 8

INVENTOR.
Stuart D. Pool
Paul O. Pippel
Atty.

United States Patent Office 3,153,311
Patented Oct. 20, 1964

3,153,311
MOBILE FRUIT PICKER
Stuart D. Pool, Naperville, Ill., assignor to International Harvester Company, Chicago, Ill., a corporation of New Jersey
Filed Nov. 14, 1960, Ser. No. 69,101
23 Claims. (Cl. 56—328)

This invention relates to a new and improved mobile fruit picker and constitutes improvements over the inventions shown and described in the pending applications of Fred D. Lasswell, Serial No. 747,275, now Patent 3,040,507, filed July 8, 1958, and Serial No. 36,448 filed June 15, 1960.

An important object of this invention is to provide an easily maneuverable vehicle having a fruit-picking panel thereon and arranged and constructed to be adjustably positioned relative to the vehicle and capable of moving into and out of a fruit bearing tree in the harvest of fruit from that tree.

Another important object of this invention is the provision of means in a wheel type tractor wherein the steerable wheels are positioned at the opposite end of the tractor and at the outer end of an auxiliary frame which is used to carry a harvesting unit.

Another and still further important object of this invention is to equip a tractor-mounted fruit harvester with means to adjustably position the fruit harvester at any desired angular position and vertical level relative to the carrying tractor whereby the fruit harvester may be employed to harvest fruit from any portion of a fruit bearing tree.

A still further important object of this invention is to supply a self-propelled fruit harvester comprising a fruit-picking panel mounted for vertical movement relative to the self-propelled vehicle and the fruit-picking panel further mounted for arcuate positioning relative to the self-propelled vehicle.

A still further object of this invention is to provide a self-propelled fruit harvester with a capstan on the self-propelling vehicle adapted to carry a fruit-picking panel and operating support therefor whereby the panel may be adjustably positioned by the operator to harvest fruit from various areas of a fruit bearing tree.

Another and still further important object of this invention lies in the provision of automatically compensating means for the positioning of a panel of fruit-picking spindles so that the outer ends of the spindles will remain at a fixed level during their travel into and out from a fruit bearing tree.

A still further important object of this invention is to provide a fruit-picking panel which includes a peripherally disposed fruit confining member and a plurality of fruit engaging and harvesting spindles in the interior thereof.

Another and still further important object of this invention is to provide for the initial penetration of a tree by a fruit confining member and thereafter have the fruit harvesting or disengaging spindles move into the tree and cause the removal of fruit from the branches and stems whereafter the entire panel including spindles and fruit confining member is withdrawn from the tree and continuing the harvesting of fruit during the withdrawal of the panel.

Another important object of this invention is to provide a fruit catching basket disposed at the underside of a fruit-picking panel and including means for tiltably positioning the basket for the purpose of receiving fruit from a tree and thereafter discharging the fruit previously harvested into some receptacle other than the fruit picker of this invention.

Still another important object of this invention lies in the utilization of a parallel linkage arrangement for a fruit harvesting panel mounting whereby the panel is automatically maintained at any desired angle of inclination.

A still further important object of this invention is to equip a self-propelled fruit harvester with a fruit-picking panel capable of extending to great heights to harvest fruit at the top of a fruit bearing tree, and the fruit harvester having ground engaging stabilizing pads automatically acting to engage the ground at spaced positions on both sides of the self-propelled fruit harvester to thereby give stability to the harvester regardless of the extension or position of the fruit-picking panel relative to the self-propelled harvester.

A still further important object of this invention lies in the use of hydraulic controls for the various mechanisms of the fruit picker of this invention and including means for adjustably positioning the fruit-picking panel rapidly from one position to another on a fruit bearing tree whereby the entire tree may be quickly harvested of its fruit by reason of the maneuverability of the fruit-picking panel and the equally maneuverable self-propelled vehicle around the base of the tree.

Other and further important objects and advantages will become apparent from the disclosures and the following specification and accompanying drawings.

In the drawings:

FIGURE 2 is a perspective view in detail of a portion of the back of the fruit-picking panel as associated with the self-propelling vehicle on which the panel is mounted;

FIGURE 3 is a top plan view of the fruit picker of this invention and showing the panel in diagrammatic form in various adjusting positions thereon;

FIGURE 4 is a front-elevational view of the mobile fruit picker of this invention;

FIGURE 7 is a top plan view of the fruit-picking panel of this invention;

FIGURE 8 is a side-elevational view of a portion of the fruit-picking panel, and particularly showing the operating mechanisms for the hinging basket at the bottom of the panel;

FIGURE 11 is a sectional view taken on the line 11—11 of FIGURE 3 and showing the construction of the capstan;

FIGURE 12 is a sectional view taken on the line 12—12 of FIGURE 3 and further shows the details of attachment of the fruit-picking panel and its supporting structure to the vehicle frame;

Figure 1:
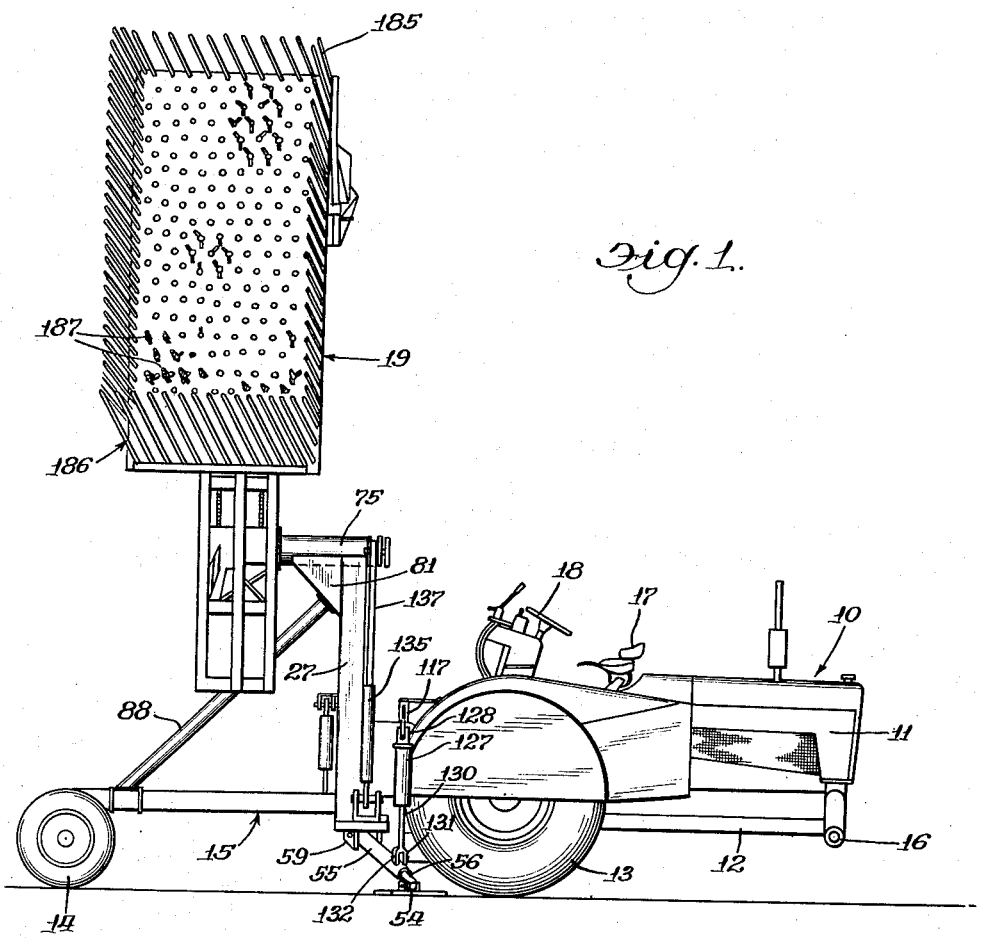
FIGURE 1 is a side-elevational view of the self-propelled fruit picker of this invention.

As shown in the drawings, the reference numeral 10 indicates generally a tractor or other power unit which includes an engine 11, a chassis 12, large traction wheels 13, and steerable wheels 14 carried at the outer end of an auxiliary frame 15. In the device of this invention, the tractor or mobile structure 10 is of a conventional wheel type, but with the steerable wheels moved from their normal location which has been at 16 to the other end of the vehicle on the outer extremity of the auxiliary frame 15. With the arrangement as shown and the tractor generally running in the direction in which the steerable wheels 14 are at the forward end thereof, the massive engine 11 acts as a counterbalance for the harvesting unit, which is carried on the tractor at a position generally between the traction wheels 13 and the steerable wheels 14. It should be obvious that the device of this invention may be made as a self-propelled unit or a tractor-mounted unit. As just described, the vehicle carrying the fruit picker of this invention is a tractor converted to a self-propelling unit for this particular purpose.

A fruit-picking panel 19 is, as previously stated, carried on the propulsion unit 10 between the traction wheels 13 and the steerable wheels 14. A capstan support frame 20 is built on the tractor at a position between and slightly forwardly of the large traction wheels 13 and toward the steerable wheels 14. The frame 20 is removably fastened to the chassis 12 and flanks both sides of the chassis to a position adjacent the edges of the traction wheels 13. Attention is directed to FIGURE 3 of the drawings which shows this frame 20 and the included fixed support 21 for the turntable or capstan which will be described in detail later in this specification. A fluid-operated cylinder 22 and piston 23 is pivoted at 24 to the supporting frame 20 at one end thereof. The other end of the cylinder and piston is pivotally attached at 25 to a lug 26 on the end of the auxiliary frame 15 of the tractor or power unit 10. In the operation of the cylinder and piston 22–23, when fluid under pressure is admitted or withdrawn to or from the cylinder 22, the piston 23 is extended or retracted causing a change in angular relationship between the tractor chassis 12 and the auxiliary frame 15. The fruit harvesting panel may thus be maneuvered so that it may pick fruit from a tree at various angles.

As best shown in FIGURE 2, a thrust arm 27 is generally vertically disposed on the auxiliary frame 15 adjacent the traction wheels 13 of the vehicle. An upwardly opening channel 28 is shown in FIGURES 2, 5, 11 and 12, and has spaced-apart downwardly extending flanges 29 and 29a which act as reinforcements for the channel which, as previously stated, has its side walls extending upwardly and the channel being open to the top. The channel 28 and its flanges are carried on the fixed support 21. The auxiliary frame 15 includes a pair of side-by-side longitudinally extending tubular members 30 and 31. The thrust arm 27 is pivoted around the tube 30 closely adjacent the upwardly opening channel 28. The thrust arm 27 is thus rotated with the assembly on the auxiliary frame 15. The thrust arm may be arcuately positioned relative to its vertical position, as shown in FIGURE 4, by means of thrust-hydraulic cylinders 32 and 32a, which are positioned within the channel 28 and are inclined upwardly and inwardly for engagement with the thrust arm. Each of the cylinders 32 and 32a has an extensible piston 33 and 33a. The cylinders 32 and 32a are integrally mounted at 34 and 34a respectively in the upwardly opening channel 28. A bracket assembly 35 is carried on the thrust arm 27 and hingedly receives the upper ends of the pistons 33 and 33a. The cylinders 32 and 32a are arranged so that when fluid under pressure is admitted to the cylinders an opposite amount of extension or retraction of the pistons 33 and 33a is accomplished. This insures that the thrust arm 27 will be under control at all times and may be angularly positioned in either direction to cock the fruit-picking panel 19 in any desired position.

As best shown in FIGURES 11 and 12, the rotatable assembly having relative movement with respect to the fixed support 21 includes among other parts a thrust plate 36 and a washer or spacer member 37. A bearing plate 38 and a depending skirt 39 is welded to the plate 38 and forms part of the fixed support 21. The rotatable assembly further includes a capstan proper 40 which is in the form of a vertically disposed tubular sleeve-like member. A reinforcing housing 41 for the capstan is welded at 42 to the capstan 40 and at 43 is welded to the thrust plate 36. A centrally disposed stationary tube 44 is disposed within the capstan sleeve 40 and provides the support about which the capstan is rotated. A short tubular member 45 is welded at 46 to the bearing plate 38 and is disposed substantially concentric to the outer skirt 39. A bolt 47 joins the stationary tube 44 to the stationary assembly which has just been described. The capstan 40 swingably rotates on and about the stationary tube 44. Vertically spaced sleeve bushings 48 and 49 are disposed between the sleeve capstan 40 and the inner stationary tube 44. These sleeve bearings may be of bronze or other suitable material. A cap ring 50 is positioned over the capstan 40 and forms an upper continuation thereof. However, the ring 50 is stationary and the capstan sleeve 40 rotates relative thereto. A bolt 51 passes through the cap ring 50 and thence through the internally disposed stationary sleeve 44 so that the cap ring 50 is stationary with and forms an integral part with the internal post or sleeve 44. The cap ring thus acts as a collar for the rotating capstan sleeve 40 and confines the sleeve 40 to a fixed vertical position. Angularly disposed braces 52 and 53 are used to support the cap ring 50. These braces 52 and 53 are made unitary with the frame 20 and thus are stationary relative to the tractor.

In order to efficiently carry the very heavy fruit harvesting equipment that is mounted on the carrier 10 and to gain more stability when the picker unit 19 is "overhanging" in its picking operation of a tree there is provided outwardly spaced-apart ground engaging foot pads 54 which are hinged to tubular supporting arms 55 as best shown in FIGURES 3 and 4. The supporting arms 55 have telescoping extensions 56 which are pivotally attached at 57 to spaced-apart plates 58 and 59 which in turn are welded at 60 and 61 to a depending tube 62. The tube telescopes up within the stationary tube 44 and forms a fixed part with respect thereto.

As best shown in FIGURE 12, a bushing type of sleeve or tube 63 is positioned within notches in the upwardly opening channel 28 and welded thereto to support the tube 30. The upwardly opening channel 28 is welded at 64 to the capstan tube 40. A spaced-apart end bushing 65 is joined by the housing 41 and is fixedly assembled to the bushing 63, channel 28 and the other stationary parts. A bolt 66 joins the tube 30 to the end bushing 65. It should be noted that as shown in FIGURE 11 the depending tube 62 which telescopes up within the stationary tube 44 is held securely to that tube 44 by means of the transversely extending bolt 47 which in addition to passing through the stationary sleeve 44 extends through an opening in the extension tube 62. Pairs of bearing bushings 67 and 68 and 69 and 70 are press fitted within spaced-apart tubular housings 71 and 72 which are welded to the lower end of the fabricated thrust arm 27. A reinforcing gusset plate 73 is disposed between the thrust arm 27 and the auxiliary frame and its associated elements as shown in FIGURE 12 and this reinforcement includes a diagonally positioned reinforcing bar 74 which similarly joins the thrust arm 27 with the tubular housing 71.

Attention is now directed to FIGURE 2 of the drawings which shows the thrust arm 27 and particularly the upper portion thereof which includes a tubular housing 75 disposed generally horizontally across the top of the thrust arm 27. The tubular housing 75 is welded at 76 to the upper end of the thrust arm 27. A second tubular member 77 is journaled within the tubular housing 75 and constitutes an extension of the member 75 and forms the support for the fruit-picking panel 19. An end ring or collar 78 is fastened to the tubular extension 77 by means of bolts such as shown at 79 which passes through the collar and through the internally positioned sleeve 77. Spaced apart parallel reinforcing gussets 80 and 81 join the housing 75 to the sides of the thrust arm 27 and thus enable support of the substantially overhung fruit-picking panel 19. The attachment of the picking panel 19 to the tubular member 77 will be described subsequently as well as the employment of an arm in association with the collar 78 to maintain or accomplish angular positioning of the picker panel.

The auxiliary frame 15 for the tractor or implement carrier of this invention shall now be further defined in detail. Attention is directed to FIGURES 2 and 3. A sleeve bushing 82 is welded or otherwise fastened in the upwardly opening channel 28 and is adapted to receive an extension 83 of the tube 31. The extension 83 and tube 31 are integral one with the other by welding or otherwise fastening together. The tubular extension 83 is supported within the bushing 82 which is fastened to the channel 28 as just described. A locking pin 84 passes through the bushing 82 and the extension 83 of the tube 31 to thereby make a unitary assembly. The two generally elongated tubes 30 and 31 are joined at intervals along their lengths by connecting plates 85, 86 and 87. This insures that the parallel tubes act as one structural member. An end plate 88 further joins the tubes 30 and 31. An angularly disposed tubular brace 89 extends from a cross-plate 90 which joins the spaced-apart gusset members 80 and 81, as shown in FIGURE 2, at 91 to a supporting pad 92, as shown in FIGURE 3, directly over the tubular member 30 of the auxiliary frame 15. This construction, of course, stabilizes the thrust arm 27 relative to the auxiliary frame 15 and provides indirectly for the adequate support for the fruit-picking panel 19.

As best shown in FIGURE 3, the auxiliary frame structure 15 of the carrier is equipped with diverging arms 93 and 94 at the outer end thereof. These arms 93 and 94 are adapted to carry the steerable wheels 14. As best shown in FIGURE 4, a plate 95 receives the diverging arms 93 and 94 at their inner ends. The outer ends of the arms 93 and 94 carry L-shaped members 96 and 97, respectively, and it is the lower ends of these L-shaped members 96 and 97 which act as spindles for the dirigible wheels 14. Returning now to FIGURE 3, it is shown that bellcrank elements 98 and 99 are mounted on the members 96 and 97 and enable concurrent angling for steering of the steerable wheels 14 by reason of a connecting tie rod 100. The tie rod 100 joins the outer ends of the bellcrank elements 98 and 99 as clearly shown in FIGURE 3. A tubular extension 101 of the frame member 30 projects beyond the plate 95 and constitutes the support for a hydraulic cylinder 102 which lays in a generally horizontal position and is hinged at 103 to a bracket 104 on the tubular extension 101. A piston 105 cooperates with the cylinder 102 to provide the power means for effecting steering of the wheels 14. The piston 105 is pivotally attached at 106 on a bracket 107 affixed to the tie rod 100. Thus as the piston 105 is extended or retracted from its cylinder 102 the tie rod 100 will pull the bellcrank elements 98 and 99 in either direction as desired to provide for the power steering of the wheels 14.

The arms 93 and 94 are constructed in such a manner as to make them adjustable in length and this is shown in FIGURE 3. The arm 93 contains telescopic parts 108 and 109 while the arm 94 includes telescopic parts 110 and 111. These parts 108 and 109 and 110 and 111 may have any desired extension with respect to each other dependent only upon the length of the members and retention of sufficient telescoping or overlapping to provide for a rigid arm 93 or 94. A plurality of spaced holes 112 are provided in the tubular part 109 while a removable bolt 113 associated with the part 108 provides for removable joining of the telescopic parts 108 and 109 in a desired fixed relationship in any one of the holes 112 which extend over a substantial portion of the length of that telescopic member 109. Similarly, a removable bolt or pin 114 is used for holding the telescopic parts 110 and 111 in a desired relationship. For further convenience and reinforcement, the end portions of the members 108 and 110 have enlarged annular collars 115 and 116, respectively, which extend therearound and provide the carrying portion for the removable bolts or pins 113 and 114, respectively.

Figure 5:
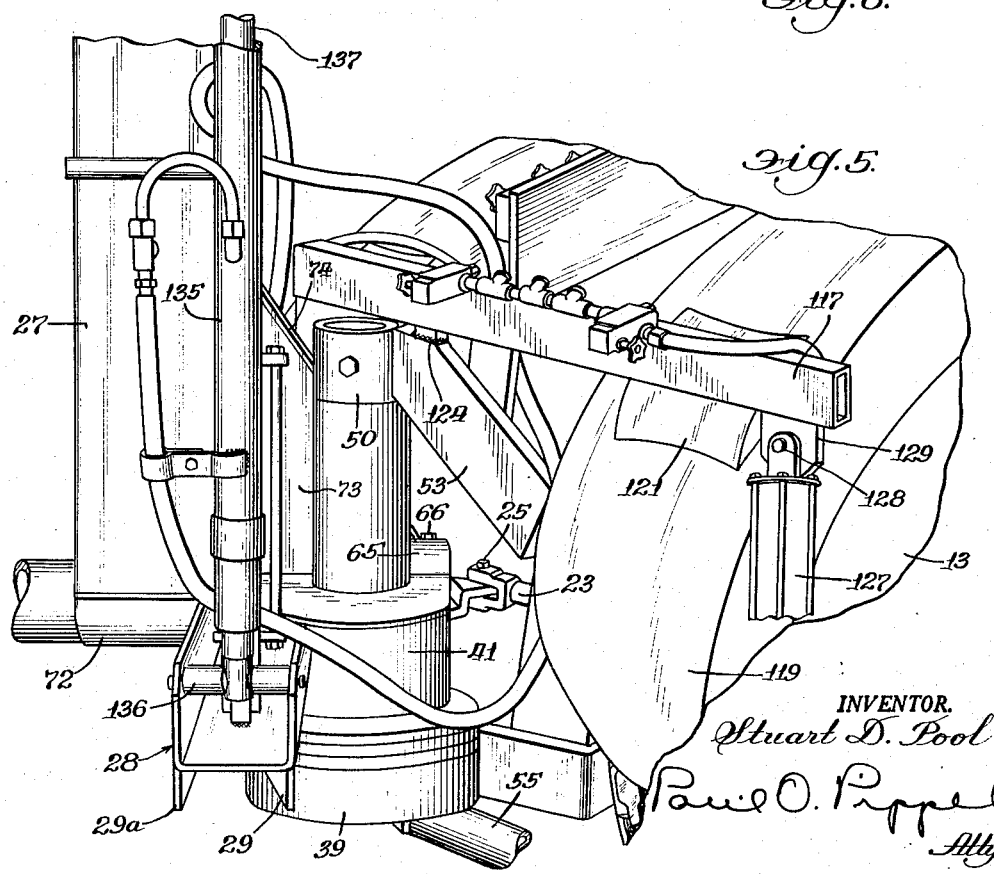
FIGURE 5 is a perspective view in detail of a portion of the capstan interposed between the propelling vehicle and the fruit-picking panel.

A rectangularly-shaped reinforcing tube 117 extends across the machine between the tractor fenders 118 and 119 which shroud the traction wheels 13. Pads or plate members 120 and 121 are built unto the fenders 118 and 119, respectively, to which the member 117 is removably attached by bolts 122 and 123, as shown in FIGURE 3. The cross member 117 is weldably attached to the diverging arms 52 and 53 of the supporting frame 20 at 124 and 125. Hydraulically operated cylinders 126 and 127 are provided at the outer ends of the cross supporting member 117 and are disposed generally vertically. The cylinders are hinged at 128 on brackets 129 as shown in FIGURE 5, which are in turn weldably attached to the underside of the cross member 117. Downwardly projecting pistons 130 as shown in FIGURE 1 from the cylinders 126 and 127 have their lower ends pivotally attached to the arms 55 by a clevis 131 on the end of the piston 130 which engages a bracket 132 on the arm 55.

As best shown in FIGURES 2 and 3, an arm 133 is welded at 134 to the end ring or collar 78 which is a fixed part of the tubular member 77 which, in turn, supports the fruit-picking panel 19. A cylinder 135 is hingedly mounted at 136 within the upwardly opening channel member 28 at the extreme right end as viewed in FIGURE 2. A piston 137 cooperating with the hydraulic cylinder 135 extends substantially vertically where it hingedly engages at 138 on the outer end of the arm 133. This cylinder and piston 135–137 constitute a parallel linkage with the thrust arm 27 and the channel member 28 at the lower side and the cross arm 133 at the upper side. When these elements form a rectangle, the panel 19 should be in vertical position. Now, when it is desired to effect a tilting of the panel, the length of the link which constitutes the cylinder 135 and piston 137 is changed by admitting or withdrawing fluid under pressure from the cylinder 135. Inasmuch as the upwardly opening channel 28 is affixed relative to the tractor or carrier, the arm 133 must, of necessity, rotate depending upon the degree of extension or contraction of the link 135–137. Now, because the arm 133 is affixed to the collar 78 which, in turn, is affixed to the tubular member 77 upon which the fruit picker is mounted, there is a concurrent angling of the fruit picker panel to the same degree as the arm 133.

Another hydraulic cylinder 139 is hingedly mounted at 140 on the thrust arm 27 and projects downwardly and laterally. A piston 142 cooperates with the cylinder 139 and terminates in a clevis 143 which is associated with a bracket 144 which is welded or otherwise fastened to the tubular member 31 of the auxiliary carrier frame 15. A hinge pin 145 joins the clevis 143 and the bracket 144. This cylinder and piston 139–142 is not manually operated, but operates in response to angular positioning of the thrust arm 27, and thus is what is called a slave cylinder whereupon tilting of the thrust arm 27 by the cooperating hydraulic cylinders 32 and 32a will cause movement of hydraulic fluid from and into the slave cylinder 139. The function of this cylinder will be subsequently described in detail, but, for the present, it will just be stated that it operates to advance and retract a fruit catching basket during insertion and retraction of the picking spindles of the panel 19 into the tree.

The picking panel 19, as shown in FIGURE 4, includes a rectangularly shaped supporting frame 146 at the back thereof, and it is this frame member 146 which, in turn, is fastened to a fabricated structure 147 which is carried on the supporting tube 77. A sleeve portion 148 forming a part of the structure 147 is mounted on and fastened to the tubular member 77, as clearly shown in FIGURE 4. The structure 147 includes spaced-apart side plates 149, as shown in both of FIGURES 2 and 4, and includes cross braces 150 which act to reinforce the structure 147. The ends of the structure 147 away from the support on the tube 77 engage the rectangular frame member 146 and are fastened integrally thereto.

Figure 13:
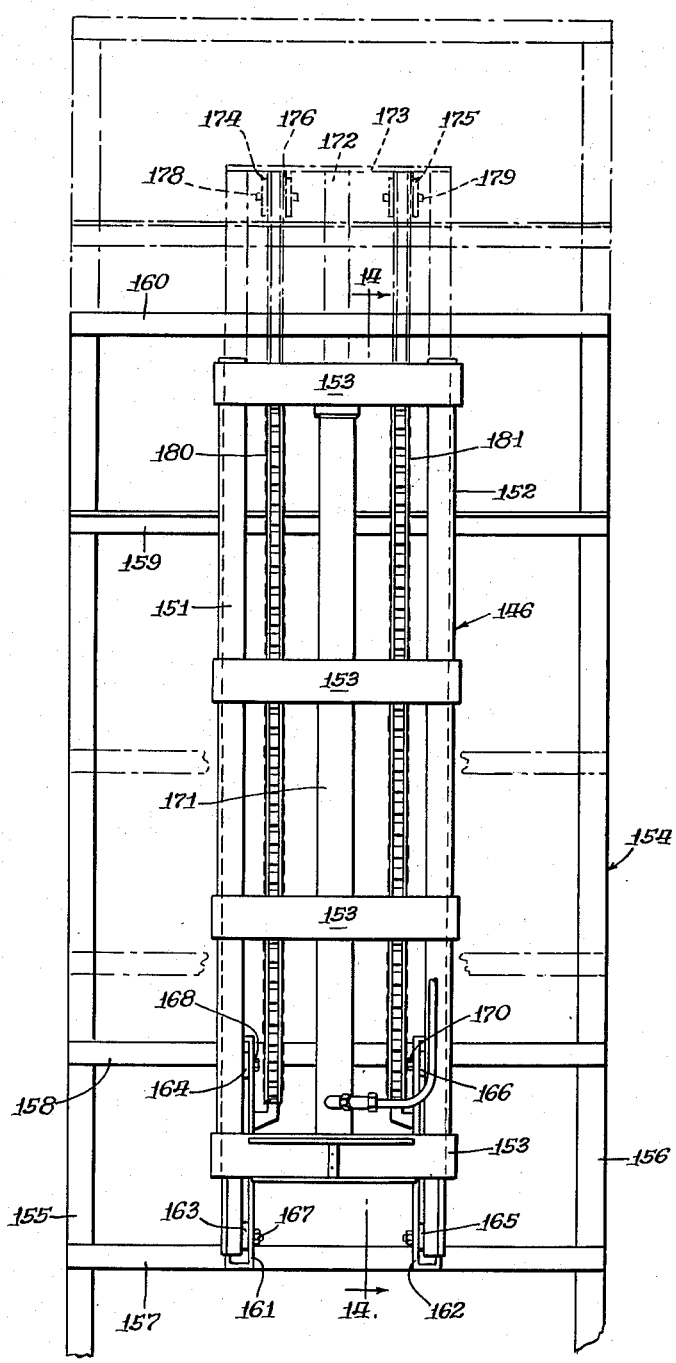
FIGURE 13 is a rear elevational view of the fruit-picking panel and its elevating mechanism.

The rectangularly shaped supporting frame 146 as shown in FIGURE 13 comprises vertically disposed and horizontally spaced-apart side members 151 and 152. These side members constitute channels which are faced inwardly toward each other and form vertical tracks within which the fruit-picking panel 19 is vertically slid. A number of crossframe members 153 spaced at vertical intervals join the side members 151 and 152 in fixed parallel relationship.

The fruit-picking panel 19 has a generally rectangular frame structure 154 at its rear thereof. The frame structure includes laterally spaced-apart vertical side members 155 and 156 and further includes crossmembers 157, 158, 159 and 160. The crossmembers 157 and 158 carry vertically disposed tie members 161 and 162 which are welded thereto rearwardly of the plane of the side members 155 and 156. This construction is clearly shown in FIGURE 14 wherein it is evident the side frame members 155 and 156 are angle members and the crossmembers 157, 158, and 160 are square tube members. The crossmember 159 is an angle member. The vertical members 161 and 162 each carries an outwardly extending pair of guide rollers 163 and 164 on the member 161 and 165 and 166 and the member 162. Each of the rollers is mounted on affixed stub shafts which are evidenced by hexagonally shaped bolt heads 167 and 168 on the member 161 and 169 and 170 on the member 162.

Figure 14:
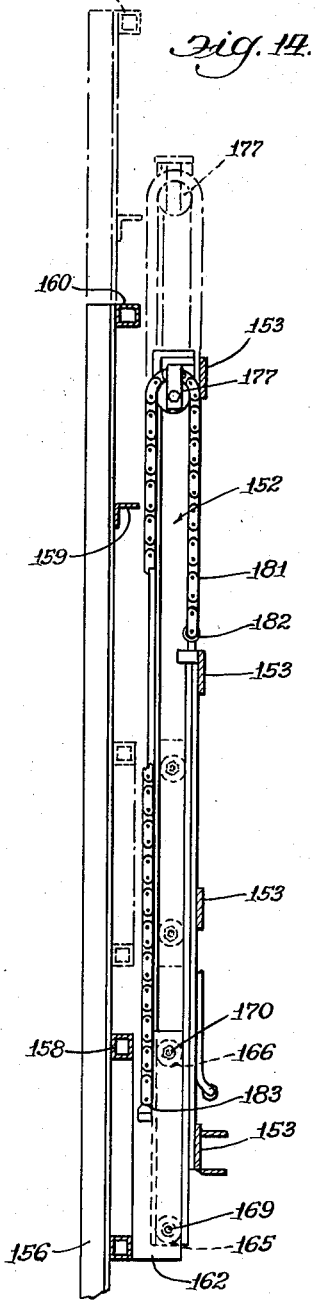
FIGURE 14 is a sectional view taken on the line 14—14 of FIGURE 13.

Movement between the picker frame 154 and the stationary supporting frame 146 is accomplished by a hydraulic cylinder 171 which is disposed centrally of the side channel members 151 and 152 and includes an upwardly extending piston or ram 172. The cylinder 171 is fastened to and forms a fixed part of the rectangularly shaped supporting frame 146. A crosshead 173 is mounted on the top of the cylinder ram 172 and is equipped with downwardly projecting spaced-apart brackets 174 and 175 which carry sheaves or roller members 176 and 177 which, as shown in FIGURE 13, are mounted on cross shafts 178 and 179 respectively. Roller chains 180 and 181 are fastened as shown in FIGURE 14 at 182 to one of the stationary crossmembers 153. The chains extend upwardly from this point of anchoring around the rollers 176 and 177 and thence down on the inside between the relatively moving elements where they are attached at the lower ends thereof to the carriage at 183. The carriage, designated by the numeral 184, is formed by the members 161 and 162 with their respective rollers 163, 164, 165 and 166. In the operation of the lift mechanism the cylinder ram 172 is extended, carrying with it the crosshead 173 and thus also pulling up on the carriage 184. In the operation of the device, as the piston or ram 172 is projected upwardly it carries with it the rollers 176 and 177 thus pulling up on the carriage 184 and inasmuch as the carriage 184 is formed unitarily with the picker frame 154 the entire panel 19 rises relatively to the rectangular supporting frame 146. The employment of the chain in the manner shown creates a multiplication of lifting of the panel relative to the supporting members 146 and thus for each unit of movement of the cylinder ram or piston 172 there is a comparable movement of two units of the picker panel.

As best shown in FIGURES 1, 4, 7 and 8, the picker panel 19 includes peripherally arranged divider rods 185, a fruit catching basket 186 and a plurality of fruit picking spindles 187. The purpose of the mobile fruit picker of this invention is to enable the insertion of a fruit-picking panel into a fruit ladened tree, such as shown and described in the copending Fred D. Lasswell applications mentioned above. The rotatable fruit picking spindles enter into the surface of the tree whereupon the spindles engage the fruit and spin them loose from their supporting branches. It should be understood the spindles may be rotated in either direction or may be rotated in one direction on the movement of the spindles into the tree and in the opposite direction upon withdrawal from the tree. An auxiliary rectangular frame 188 is spaced outwardly from the back frame 154 and, as will hereafter be described, facilitates the entering of the perimetral divider rods 185 and the fruit catching basket 186 into the tree prior to insertion of the fruit engaging and removing spindles 187. As shown in FIGURES 4 and 8, the dividing rods 185 include the forwardly disposed sleeve-like members 189 having tree penetrating points 190 and the tubes 189 are fastened to the auxiliary frame 188 by means of fastener or clamp elements 191. The divider rods further include rod-like members 192 which are anchored at 193 on the main frame 154 and project outwardly and telescope within the sleeve or tube members 189. As shown in FIGURE 8, when the auxiliary frame 188 is extended the tubular sleeve members 189 slide outwardly on the rod members 192.

The clamp members 191 are arranged to encircle the tubular divider members 189 and hold them to the rectangular frame 188 which moves relative to the main frame 154 of the fruit-picking panel 19.

A scissors linkage designated generally 195 is arranged and constructed between the rectangular frame members 154 and 188. Lug members 196 and 197 are bolted or otherwise fastened as shown at 198 and 199 to the frame 154. A first link 200 is pivoted at 201 on the lug 196 and at its other end is fixed at 202 to a bracket-like member 203. A hydraulic cylinder 204 is pivotally mounted at 205 on a fixed lug extension 206 on the movable frame 188. A piston 207 is pivotally mounted at 208 on the bracket member 203 at a position beneath the attachment 202 of the link 200. The lug 197 has hingedly mounted thereon at 209 a link 210, as shown in FIGURE 8. A second link 211 is hingedly mounted at 212 to the first link 210. A third link 213 is hingedly mounted at 214 to the other end of the second link 211. The links 200 and 211 are crossed and are pivotally joined at 211a making it the scissors pivot for this linkage. This third link 213 is, in turn, pivotally mounted at 215 to the auxiliary movable frame 188. Extension or retraction of the piston 207 from the cylinder 204 causes the scissors linkage 195 to open or close depending upon the direction of movement of the piston 207. In a completely retracted position of the piston, the scissors linkage 195 is shown completely collapsed as in FIGURE 4 wherein the divider rods and fruit catching basket are closely positioned adjacent the stationary rectangular frame 154 of the fruit-picking panel 19, whereas in FIGURE 8, the piston 207 has been extended causing the scissors linkage to open and cause an extension of the auxiliary frame 188 and its divider rods 189 for insertion into a tree to have fruit picked from the tree. Operation of the cylinder and piston 204–207 is accomplished by a manually operated control valve next to the operator of the vehicle for admitting or withdrawing fluid under pressure to the cylinder 204. In the operation of the device of this invention, the vehicle is maneuvered close to a fruit-bearing tree whereupon the control valve, not shown in detail, is actuated to admit fluid under pressure to the cylinder 204 thereupon causing, as just described, the advancement of the rectangular frame 188 with its plurality of divider rods 189 and the fruit catching basket 186 into the tree. This now insures that the removal of the fruit from the tree in subsequent operations will be confined within the divider rods 189 and will fall into the basket 186. After the divider rods 189 are completely within the tree, then the thrust arm 27 is tilted toward the tree by reason of the operation of the cylinders 32 and 32a causing the fixed frame 154 of the panel 19 to be moved forwardly into the tree until the frame 154 is in the same relationship to the separably movable frame 188 as it is shown in FIGURE 4 in the retracted position. The panel 19 has a plurality of rotating spindles 187 mounted into the rectangular frame 154 and thus the spindles, which will be described in detail later in this specification, have penetrated the tree approximately coextensive with the divider rods 189. Rotation of the spindles 187 in cooperation with each other effects a picking or a removing of the fruit from the branches or stems and the fruit then tumbles down through the rotating spindles 187 and is confined to the spindle panel by the perimetral divider rods 189 whereafter the fruit falls into the basket 186 for deposit and later removal. Now when it is desired to withdraw the picking panel from the tree, the thrust arm 27 is swung away from the tree carrying with it the panel 19 or at least that portion of the panel associated with the rectangular frame 154. The slave cylinder 139, previously described, is arranged and constructed to again extend the piston 207 from the cylinder 204 automatically so that as the frame 154 is removed from the tree, the rectangular frame 188 is actually extended therefrom during withdrawal such that in overall movement the frame 154 is withdrawn at a considerably greater speed than the frame 188 thereby insuring entrapment of all loose fruit during the harvesting thereof. Now when the rectangular frame 154 is fully withdrawn from an outward swinging of the thrust arm 27, the control valve for the cylinder 204 is actuated to remove fluid under pressure therefrom allowing the piston 207 to collapse within the cylinder and thus draw the divider rods 189 and the basket 186 inwardly to the position as shown in FIGURE 4.

The basket 186 is operated by a hydraulic cylinder 216 which is pivoted at 217 on a bracket member 218 forming a part of the rectangular frame 188. A piston 219 cooperating with the cylinder 216 is hingedly attached at 220 to a link member 221 which is pivoted at 222 to the lower end of the bracket 203. The pivot point 222 is fixed relative to the frame 188 by means of a lower extension thereof 223.

The fruit catching basket 186 generally includes a back wall 224 preferably made of expanded sheet metal and a plurality of upwardly and forwardly inclined rods 225 which are of graduated length such that the ends thereof are closely adjacent the lower perimetral divider rod 189 and thus constitute a relatively complete peripheral enclosure for the fruit as it is picked. As the fruit cascades down through the offset spindles 187 it is confined within the panel by the outside divider rods 189 and thence falls into the basket 186 where it moves down the inclined rods 225 and thence deposits against the back wall 224. Following completion of the harvesting from any particular portion of the tree and when the basket 186 is relatively full, the panel is withdrawn and the panel is then raised and the basket opened by operation of the cylinder and piston 216–219 causing the fruit to fall forwardly out from the rods 225 into any convenient receptacle as desired.

In the movement of the panel 19 into the tree in the manner just described the primary movement is occasioned by an arcuate tilting of the thrust arm 27. Because of the parallel linkage arrangement the spindles 187 retain their parallel relationship, but they actually move somewhat downwardly depending upon the degree of penetration into the tree and that is accomplished by a tilting of the thrust arm 27. It is desirable in harvesting fruit from trees to maintain the level of penetration of the fruit picking spindles and thus a slave cylinder 226 is hingedly mounted close to the thrust arm 27 and adjacent the channel 28. The hydraulic cylinder 226 is provided with a piston 227 which is hingedly mounted at 228 on a bracket 229 formed on and integral with the thrust arm 27. This cylinder-piston combination 226–227 is a slave cylinder and is arranged and constructed to admit fluid under pressure therefrom to the cylinder 135 when the thrust arm 27 is turned inwardly toward tree penetration. This causes a compensating tilting of the fruit-picking panel 19 such that the forward points of the spindles 187 remain on a generally straight line path throughout full tree penetration. This is conductive to more efficient harvesting of fruit from trees and minimizes damage to branches which might tend to be broken if the mass of spindles moved downwardly therethrough. This foregoing structure constitutes an attitude control means universally mounting the picker relative to the mobile structure 10.

No attempt is being made to show the detail drive to each of the fruit picking spindles 187, but in FIGURE 2 there is shown chains 230 which surround sprockets 231 formed on the rearward ends of the spindles 187 which are journaled within bracket members 232 on the frame member 154. An engine 233 is mounted on the backside of the fruit-picking panel 19 and imparts drive to a shaft 234 which is journally mounted in a bracket 235 on the frame structure 154. A chain 236 is driven by the shaft 234 and carries drive down to a sprocket 237 whereupon other sprockets mounted on the same shaft 238 as the sprocket 237 impart drive to the various chains 231 through the medium of intermediate chains 239.

Figure 9:
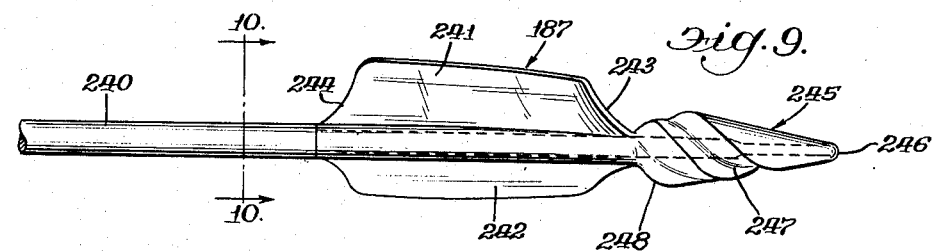
FIGURE 9 is a side-elevational view in detail of certain of the fruit-picking spindles as used in the picking panel of this invention.
Figure 10:
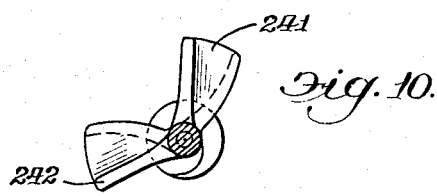
FIGURE 10 is a sectional view taken on the line 10—10 of FIGURE 9.

As best shown in FIGURES 9 and 10, the fruit picking spindles 187 are equipped with a shaft 240 and spirally turned formed rubber flight members 241 and 242. These flight or wing members 241 and 242 are spaced apart a distance substantially 120° and are equipped with a spiral twist extending from the forward edge thereof to the rearward edge. Both of the wing members 241 and 242 are provided with arcuate shaped forward edges 243 and rearward edges 244 which are somewhat arcuately shaped but at a steeper angle. The forward notches 243 are for the purpose of receiving relatively round shaped fruit into the scope of the fins or wings 241 and 242 whereas without this arcuate notch there might be a tendency for the blunt ends of a picking fin to repel the fruit. A nose cone 245 is provided with a relatively sharp point 246 at its forward end and is further provided with generally spiral shaped grooves 247 running from front to rear at the large portion of the cone 245. The cone 245 further tapers downwardly and inwardly as shown at 248 to thereby insure the entrapment of fruit on the inside of the spindle rather than permitting the fruit to escape forwardly out from the spindle once the nose cone has penetrated therethrough. The combination nose cone 145 and dual spirally turned fins 241 and 242 are preferably made of rubber or similar compressible material so as not to injure the fruit in the picking thereof. Further, the nose cone 145 is preferably equipped with a slick surface to facilitate easy penetration into a fruit bearing tree.

Figure 6:
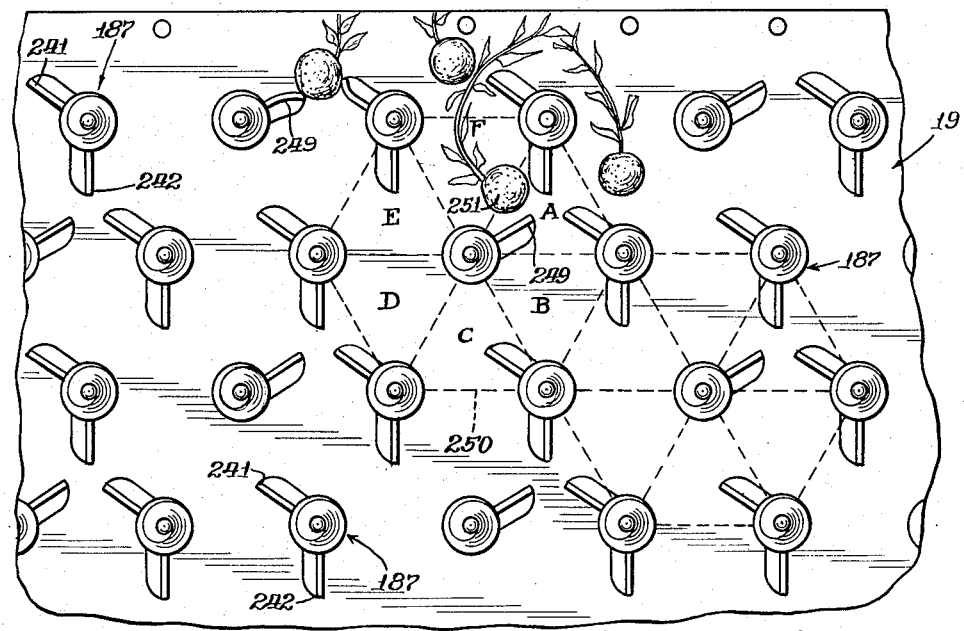
FIGURE 6 is a front-elevational view of a portion of a plurality of the fruit-picking spindles and including therein a diagrammatic showing of the removal of fruit from the tree by the fruit-picking spindles.

As best shown in FIGURE 6, the plurality of fruit picking spindles 187 is shown in the form of a panel which is a portion of the fruit-picking paney 19 shown in other figures of the drawings. The two fin picking spindles shown in FIGURES 9 and 10 and described in detail constitute the majority of the spindles in the panel 19, however, in each group of seven spindles in which a regular hexagonally shaped pattern is equipped with a dual fin spindle at each point thereof a center point in the hexagon is equipped with a spindle 187 having only one fin 249, as shown in FIGURE 6. The hexagonal shaped pattern is shown at 250 and the timing and arrangement of spindle fins is such that the center one fin spindle successively closes each triangle of six such triangles formed within the hexagon. The triangles for convenience will be numbered A, B, C, D, E and F, numbered clockwise around the hexagon. As shown, the triangle A has all three fins projecting inwardly toward the center thereof such that an orange or or other hard fruit such as shown at 251 will be engaged by these inwardly projecting fins and given a rotational movement to thereby twist the orange or fruit from its stem. The particular arrangement of spindles and the timing thereof is shown more particularly in the copending application of Fred D. Lasswell, Jr., Serial No. 36,448.

The operation of the fruit picker of this invention has been generally described in the various stages thereof, but for convenience and a better understanding of the overall operation an attempt will be made to describe the overall operation of the machine. As stated in the objects above, the purpose of the fruit picker of this invention is to harvest generally hard fruit from trees. This includes citrus fruit and thus the fruit is generally spherical in shape and it is the object of the fruit picking spindles to engage the hard round fruit and spin the fruit loose from its stem. Following loosening of the fruit from the stem the fruit cascades downwardly in a tumbling fashion between the offset spindles until it reaches the bottom basket 186 whereupon it is retained until such time as the operator desires to remove the fruit from the basket by actuating the cylinder 216 and dropping the fruit into some other receptacle. The power unit of tractor 10 is driven into an orchard and maneuvered closely adjacent a tree to be harvested. The fruit-picking panel or harvesting unit 19 is swung to a position adjacent the surface of the tree by operation of the cylinder and piston 22–23. In effect the carrier 10 has an articulated chassis about the capstan described above which permits turning on a short radius as well as positioning the picking panel against the surface of the tree. Following final positioning of the carrier 10 adjacent the tree to be picked, the cylinders 126 and 127 are actuated causing the ground engaging pads 54 to engage the ground at outwardly spaced positions thus giving substantial stability to the picker during its operation. After the fruit-picking panel 19 has been positioned closely adjacent the surface of a tree which is to have its fruit harvested, the operator manually actuates a valve to control the admission of fluid under pressure to the cylinder 204 causing an extension of the piston 207 which thereby moves the side frame or the divider rods and fruit catching basket 189 and 186 respectively into the tree. Following the initial or leading insertion of the perimetral divider rods 189 into the tree and amongst the fruit to be picked, the main panel frame 154 carrying the rotating fruit picking spindles 187 is moved against the surface of the tree by arcuately shifting the thrust arm 27 toward the tree by an actuation of the cylinders 32 and 32a. At this time also the thrust arm 27 actuates the slave cylinder 139 to extend its piston 142 to thereby automatically actuate the cylinder and piston 204–207. This action causes a differential in movements between the picking panel and the divider rods 189 and basket 186 such that when the panel is fully extended into the tree the divider rods and basket are brought back to their original relationship with the panel as indicated by the dash-line position of the side rod support 188 in FIGURE 8. Also and simultaneously as the panel progresses toward the tree the slave cylinder 226 is actuated causing the piston 137 of the cylinder 135 to be extended thereupon imparting an upward tilt to the panel and in effect maintaining the level of the forward or penetrating ends of the spindles 187. The tilting of the entire panel results in a greater inclination of the picking spindles 187 but the forward or penetrating ends of the spindles have remained at a fixed height throughout their travel into the tree and rather than disturbing the fruit removal the greater angle of the spindles appears to enhance fruit removal without damage to the branches or foliage of the trees. The spindles with their spirally disposed fins are preferably rotated such that the spiral fins act as screw threads to easily penetrate in and between the branches of a fruit bearing tree. The spindles 187 now cooperate with the round hard fruit 251 as shown in FIGURE 6 to effect removal of the fruit from the tree and when removed the fruit tumbles down in a cascading fashion over the spindles therebelow until it reaches the basket 186 where the inclined rods 225 cause an aggregation of the harvested fruit in the rear of the basket adjacent the expanded metal backwall 224. In effect, the operation of harvesting a tree is to insert the rotating fruit picking spindles over the entire surface of the tree in a patting fashion by the carrying panel. It should be understood that in the operation of the device the link 135–137 which constitutes a cylinder and piston may be manually extended or retracted to gain any angle for the picking spindles 187 after operating the picker at any one location in the tree for several moments and the panel 19 is then retracted by swinging the thrust arm 27 away from the tree. This simultaneously causes a retraction of the picker spindles 187 which are preferably rotated in the opposite direction to minimize tree damage by "unscrewing" the spiral fins of the picking spindles. This spindle retraction also causes an actuation of the cylinder 204 by reason of the slave cylinder 139, and the divider rods 189 and the basket 225 are propelled rearwardly at a somewhat lesser rate of speed than the entire panel is moved rearwardly with the end result that the spindles 187 which act to harvest the fruit are withdrawn and the divider rods forming the perimeter of the panel and the lower fruit carrying basket are retracted at a much lesser rate of speed until the spindles 187 are fully withdrawn whereafter the cylinder 204 is manually controlled to effect complete withdrawal of the perimetral divider rods 189 and basket 186 on their frame 188. At this same time the slave cylinder 226 acts to maintain the level of the outer ends of the spindles relatively uniformly during retraction. Preliminary to moving to another position the cylinders 126 and 127 are actuated to lift the ground engaging feet or pads 54 whereafter the carrier 10 may be moved around to another location adjacent the tree and the panel swung around the capstan inclined in either direction by changing the length of the link member 135–137 or raised or lowered by the mechanism shown in FIGURES 13 and 14 whereafter the harvesting procedure again follows by lowering the ground engaging feet 54 and thereafter inserting the perimetral divider rods and the fruit catching basket into the tree followed immediately by the insertion of the panel of picking spindles 187 and thence the withdrawal of the spindles and the slower withdrawal of the perimetral divider rods and the basket for a succeeding pat at a different portion of the tree or for harvesting the fruit from another tree.

No detailed attempt has been made to show the complete hosing or control valves necessary to operating the hydraulic systems involved in this fruit picker. But a general showing of a multiple control valve 252 is shown in FIGURE 2 immediately to the front of the operator's seat 17 and a plurality of hydraulic hoses 253 is shown passing from the controlled valve 252 through the horizontally disposed tubular frame member 75 at the upper end of the thrust arm 27 and continuing through the member 77 upon which the picking panel 19 is mounted. The purpose of carrying the hydraulic hoses 253 through the tubular member at the top of the thrust arm is to avoid tangling of these hoses and to gain the most efficient position therefor inasmuch as the panel swings about the tubular member 75 as a center.

I am aware that numerous details of construction may be varied throughout a wide range without departing from the principles disclosed herein and I therefore do not intend that the patent be limited otherwise than as necessitated by the appended claims.

What is claimed is:

1. A fruit tree harvester comprising a mobile supporting structure, a fruit picking panel mounted on said mobile supporting structure, said panel having tree penetrating rotating spindles thereon, and attitude controlling means universally mounting and moving said fruit picking panel relative to the mobile supporting structure for harvesting fruit from a tree and comprising a thrust arm having a lower end mounted on the structure, a link means having a lower end mounted on the structure, a connecting element mounted on the upper ends of the arm and link means and mounting said panel.

2. A device as set forth in claim 1 in which said means includes lift mechanism for raising and lowering said fruit picking panel relative to said mobile supporting structure and includes mechanism for arcuately rotating said fruit picking panel relative to said mobile supporting structure.

3. A fruit tree harvester comprising a mobile supporting structure, a fruit picking panel mounted on said mobile supporting structure, said panel having tree penetrating rotating spindles thereon, and means mounting and maneuvering said fruit picking panel relative to the mobile supporting structure for harvesting fruit from a tree, said fruit picking panel including a first planar frame, a second planar frame disposed closely adjacent to and in front of said first frame, linkage means interposed between said first and second frames whereby the second frame may be moved forwardly away from said first frame, and said first frame having the rotatable fruit picking spindles thereon and one of said frames carrying a crop divider.

4. A device as set forth in claim 3 in which said crop divider comprises spaced-apart outwardly extending tubular members on said second frame and spaced-apart outwardly extending rod members in general alignment with said tubular members whereby upon separation of said second frame from said first frame the tubular members and rod members constitute a full crop divider from the first frame to the other ends of the tubular members.

5. A fruit tree harvester comprising a mobile supporting structure, a fruit picking panel mounted on said mobile supporting structure, said panel having tree penetrating rotating spindles thereon, and linkage means mounting said panel from said mobile structure and universally maneuvering said fruit picking panel relative to the mobile supporting structure for harvesting fruit from a tree, said tree penetrating rotating spindles having spirally disposed fruit-contacting means thereon.

6. A device as set forth in claim 5 in which said spindles are rotated in a direction in which the spirally disposed fruit-contacting means will screw into a tree on penetration of the spindles and are rotated in an opposite direction for screwing out of the tree on withdrawal of the spindles.

7. A fruit picker comprising a support, a thrust arm hingedly mounted on said support and extending generally vertically upwardly, means adjusting the angular position of said thrust arm, a cross arm carried at and fixed to the top of said thrust arm, a sleeve journally mounted on said cross arm, a fruit picking panel affixed to said sleeve and means adjusting the rotatable position of the sleeve and thus also the fruit picking panel relative to the cross arm.

8. A device as set forth in claim 7 in which the means adjusting the angular position of the thrust arm includes a first fluid operated cylinder and piston disposed on one side of said thrust arm and hingedly mounted at one end on said support and at its other end on said thrust arm at a position spaced upwardly from the hinge mounting of said thrust arm on said support, a second fluid operated cylinder and piston disposed on the other side of said thrust arm and symmetrically positioned with respect to the first cylinder and piston and hingedly mounted at one end of said support and at its other end on said thrust arm whereby the first and second cylinders and pistons are arranged to simultaneously extend one piston and retract the other piston in equal amounts to thereby angularly dispose the thrust arm.

9. A device as set forth in claim 7 in which the means adjusting the rotatable position of the sleeve includes an arm affixed to said sleeve at substantially right angles thereto, and a link having one end hingedly mounted on said support and its other end hingedly mounted on said arm and disposed generally parallel to said thrust arm.

10. A device as set forth in claim 9 in which said link is an adjustable extensible link.

11. A device as set forth in claim 7 in which there is included a frame structure interposed between said sleeve and said fruit picking panel, said frame structure including vertically disposed laterally spaced-apart track members, said fruit picking panel having guide members arranged and constructed to slidably engage said spaced-apart track members, and means vertically positioning said panel relative to said track members.

12. A device as set forth in claim 11 in which the means vertically positioning said panel includes a fluid operated cylinder and piston interposed between said frame structure and said panel.

13. A device as set forth in claim 12 in which said means vertically positioning said panel further includes a roller chain having one end thereof fastened to said frame structure and the other end thereof fastened to said panel, and said cylinder and piston arranged and constructed to engage the chain intermediate its ends and by extension or retraction raise or lower the panel relative to the frame structure.

14. A device as set forth in claim 7 in which there is included a slave cylinder and piston disposed between said thrust arm and said support and arranged and constructed to automatically incline said fruit picking panel in response to the angular position of said thrust arm.

15. A device as set forth in claim 7 in which said support is a mobile support and there is included means stabilizing said mobile support during the fruit picking operation of the fruit picking panel.

16. A device as set forth in claim 15 in which said means stabilizing the mobile support includes oppositely extending arm members hingedly mounted on said mobile support, ground engaging foot pads hingedly mounted at the outer ends of each of said oppositely extending arm members, and fluid operated cylinders and pistons positioned between each of said arms and said mobile support spaced from the hinge attachments of said arms to the mobile support whereby extension of said cylinders and pistons act to stabilize said mobile support.

17. A fruit picker comprising a support, a fruit harvesting unit, means mounting said fruit harvesting unit on said support, said fruit harvesting unit including first and a second generally rectangularly shaped frame members, said second frame member disposed at the front of and in general alignment with the first of said frame members, said first frame member comprising a panel of fruit engaging rotating spindles, said second frame member including crop divider rods on the vertical sides thereof and a fruit receiving basket at the bottom thereof, and said fruit harvesting unit arranged to pick fruit from a fruit bearing tree.

18. A device as set forth in claim 17 in which said fruit receiving basket is hingedly mounted on said second frame member.

19. A device as set forth in claim 18 in which there is included a fluid operated cylinder and piston disposed between said support and said fruit receiving basket at a position spaced from the hinge attachment of said basket to said second frame whereby said basket may be held in an up closed position relative to said spindles and divider rods or dropped open as desired.

20. A device as set forth in claim 17 in which there is included a scissors linkage joining said first and second frame members.

21. A device as set forth in claim 20 in which there is included a fluid operated cylinder and piston hingedly mounted at one end on said support and hingedly mounted at its other end to said scissors linkage whereby the second frame member may be moved away from said first frame member.

22. A device as set forth in claim 21 in which the means mounting the fruit harvesting unit includes a generally vertically disposed thrust arm having its lower end hingedly mounted on said support, the upper end of said thrust arm having means thereon to receive said fruit harvesting unit, and means angularly inclining said thrust arm.

23. A device as set forth in claim 22 in which a fluid operated slave cylinder and piston is disposed between said support and said thrust arm and is operatively connected to said fluid operated cylinder and piston arranged to operate said scissors linkage whereby following actuation of the scissors linkage cylinder and piston which causes an initial insertion of the divider rods and basket into the fruit bearing tree the subsequent tilting of the thrust arm toward the tree causing the fruit engaging spindles to penetrate the tree automatically causes a closing of the scissors linkage cylinder and piston so that when the spindles are fully penetrating the tree they are coextensive with the divider rods and basket, and conversely when the thrust arm is swung away from the tree the spindles retract and the scissors linkage is extended after which the scissors linkage cylinder and piston may be closed to subsequently withdraw the divider rods and basket.

References Cited in the file of this patent

UNITED STATES PATENTS

| | | |
|---|---|---|
| 220,607 | Ham | Oct. 14, 1879 |
| 241,406 | Nixon | May 10, 1881 |
| 382,535 | Langley | May 8, 1888 |
| 464,852 | Canuteson | Dec. 8, 1891 |
| 1,077,640 | Randall | Nov. 4, 1913 |
| 2,410,030 | Horni | Oct. 29, 1946 |
| 2,829,814 | Warner | Apr. 8, 1958 |
| 3,040,507 | Lasswell | June 26, 1962 |
| 3,077,720 | Grove et al. | Feb. 19, 1963 |